Nov. 24, 1931. J. H. TAYLOR 1,832,881
RING ROLLING MACHINE
Filed Dec. 30, 1927 3 Sheets-Sheet 2
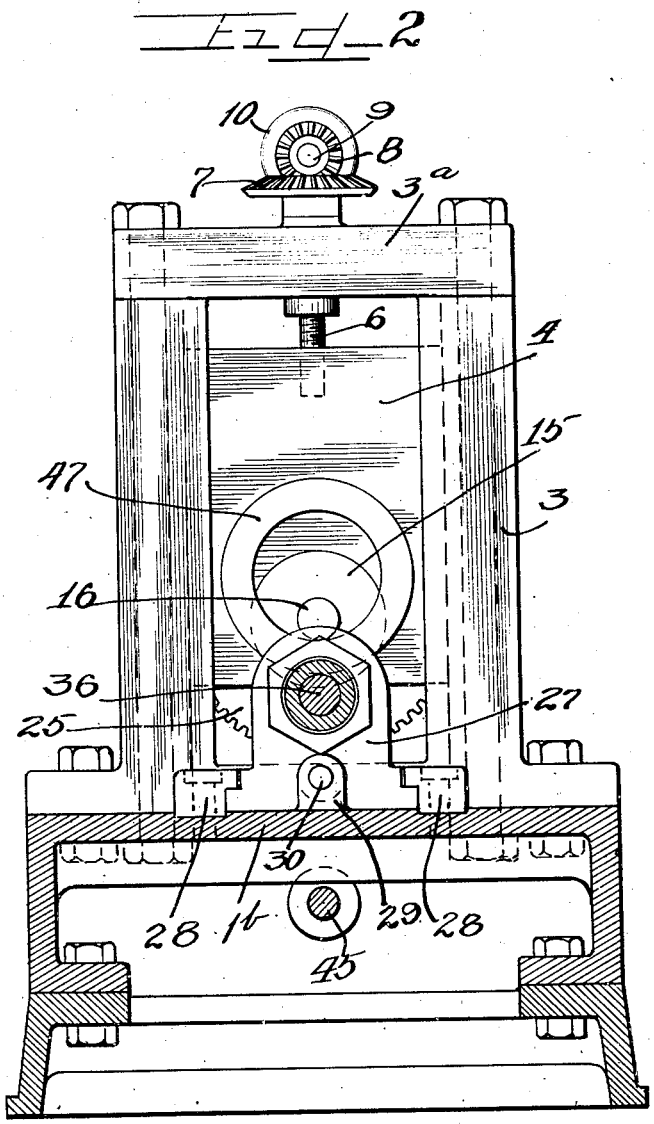

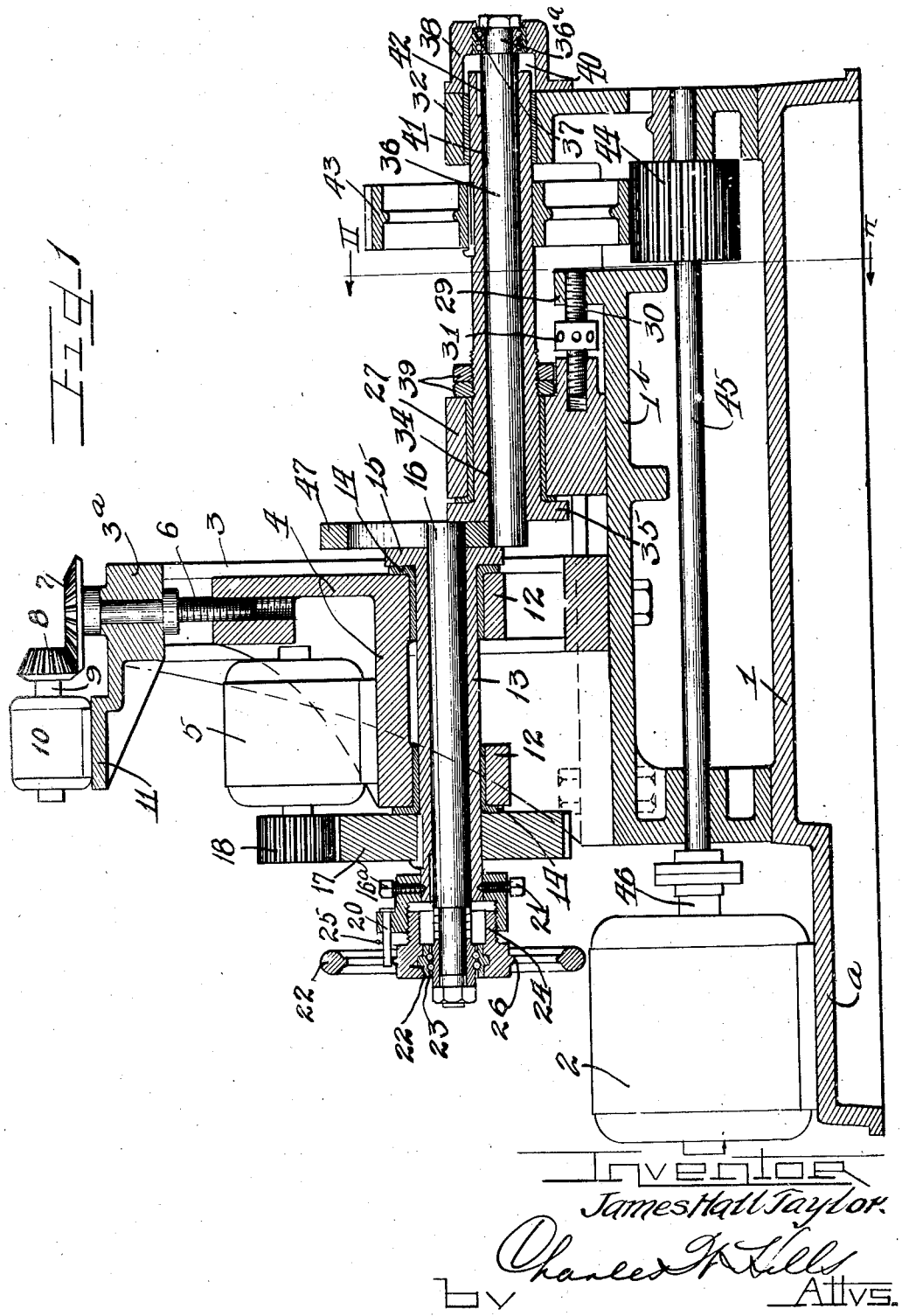

Nov. 24, 1931.  J. H. TAYLOR  1,832,881
RING ROLLING MACHINE
Filed Dec. 30, 1927  3 Sheets-Sheet 3
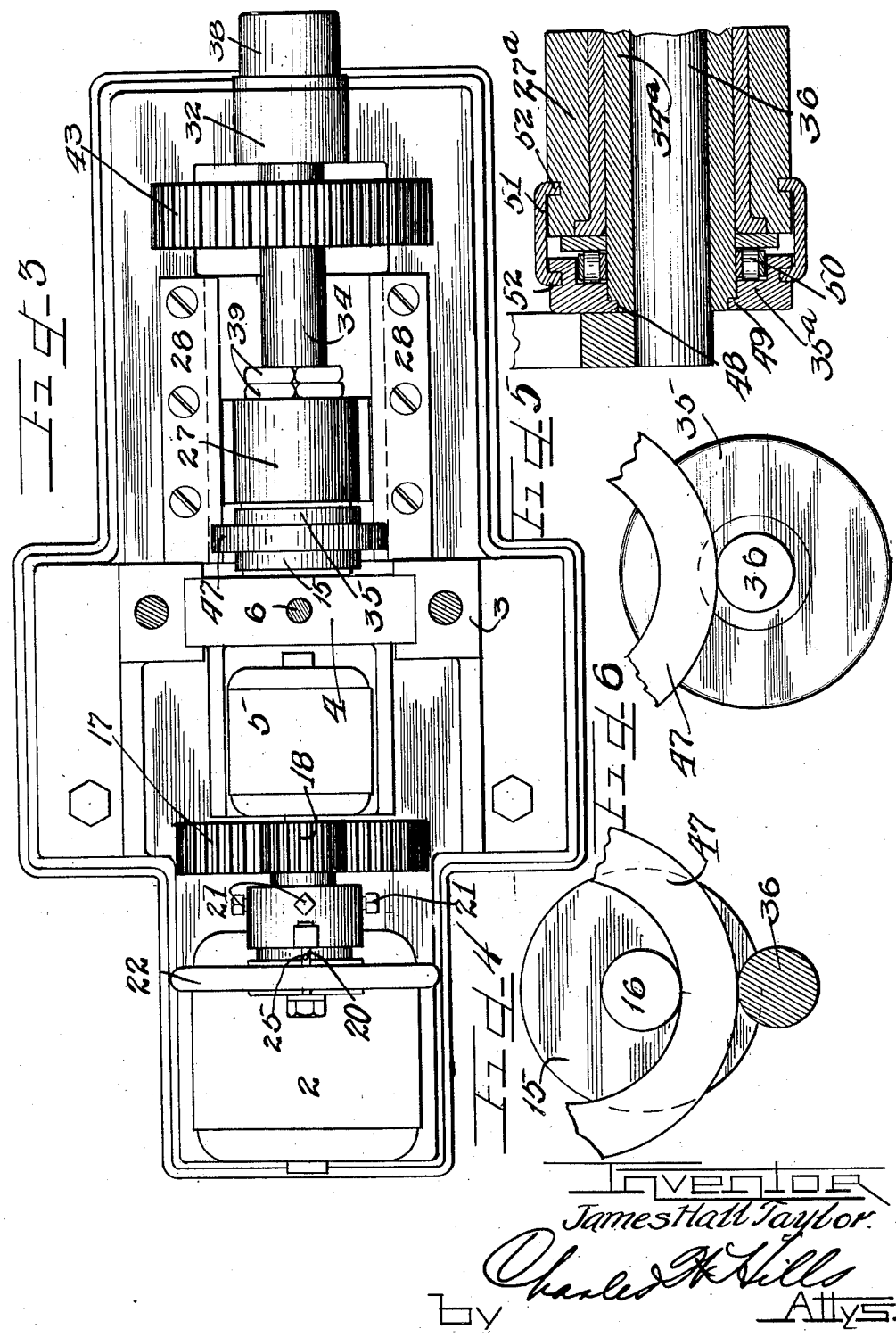
Inventor
James Hall Taylor
by Charles H. Hills
Attys.

Patented Nov. 24, 1931

1,832,881

UNITED STATES PATENT OFFICE

JAMES HALL TAYLOR, OF CHICAGO, ILLINOIS

RING ROLLING MACHINE

Application filed December 30, 1927. Serial No. 243,756.

This invention relates to a ring rolling machine and concerns itself with a mechanism for rolling rings of various widths without changing the rolls and which is exceedingly simple as to both structure and operation and in which provision is made for eliminating the cross-cutting of the ring.

The invention comprises the novel structure and combination of parts hereinafter described and more particularly pointed out and defined in the appended claims.

In the accompanying drawings which illustrate a preferred embodiment of this invention and in which similar reference numerals refer to similar features in the different views.

On the drawings:

Figure 1 is a sectional view through a ring-rolling machine involving this invention.

Figure 2 is a part sectional and part elevational view taken upon the line II—II of Figure 1 looking in the direction of the arrow.

Figure 3 is a top plan view of the machine.

Figure 4 is a diagrammatic view illustrating the passing of the ring between the rolls.

Figure 5 is an enlarged fragmentary sectional view of a modified feature of the invention.

Figure 6 is an end elevational view of Figure 5.

As shown on the drawings:

As illustrative of this invention there is shown a longitudinal base frame which is generally denoted by the reference numeral 1. This base frame comprises a support 1a for a motor 2. A U-shaped guide frame 3 is attached to the base frame 1. This guide frame 3 slidably supports a bearing 4 upon which a motor 5 is mounted. The bearing 4 is sustained by means of a screw rod 6 which is rotatably anchored in the cross-piece 3a of the U-shaped guide and which carries a beveled gear 7 at its upper end which meshes with a beveled pinion 8 secured upon the end of a motor shaft 9, the motor 10 of which being supported upon an integral bracket 11 extending from the cross-piece 3a. Obviously, the motor 10 may be operated for rotating the screw rod 6 and raising or lowering the bearing 4.

The lower end of the bearing 4 comprises a pair of spaced cylindrical bearings 12 in which a sleeve 13 is journalled, suitable bushings 14 being interposed between the sleeve 13 and the cylindrical bearings 12. The forward end of the bearing sleeve 13 is provided with a radially extending flange 15. Within the bearing sleeve 13 there is a longitudinally adjustable roller 16 which may be adjusted to project a suitable distance beyond the radial flange 15. The roller 16 is slidably keyed in the sleeve 13 as indicated at 16a. It will be noted that the bushings 14 extend beyond the bearing 4 and just beyond the said bearing a spur gear 17 is keyed upon said sleeve and meshes with a pinion 18 which is secured upon the shaft of the aforementioned motor 5. An interiorly threaded collar 20 is anchored to the rear end of the sleeve 13 by means of set screws 21 or the like. A hand wheel 22 is rotatably anchored upon the end of the roll 16 by means of combined radial and thrust bearing 23. This hand wheel is provided with an exteriorly threaded collar 24 which is in threaded engagement with the collar 20. A bolt 25 is mounted upon the collar 20 and is adapted for engaging between a suitable serrated ridge 26 upon the hub of the hand wheel 22. It will be noted that the bushings 14 are provided with flange ends which respectively fit between the bearing 4, the gear 17 and the radial flange 15 of the sleeve 13 to protect the said bearing from undue wear.

With reference to Figure 1, it will be noted that the frame 1 comprises a platform-like support 1b at the top thereof upon which the guide frame 3 is supported. A movable bearing block 27 is supported upon the top portion 1b of said frame and is guided for longitudinal movement between suitable guide blocks 28 (Figure 2) which overlap the lower lateral margins of the block 27 as clearly shown in Figure 2. A suitable lug 29 rises from the platform 1b and a screw rod 30 is threaded through the lug 29 at one end. The other end of the screw rod 30 is threaded in the bearing block 27. A jack collar 31 is secured upon the screw shaft 30 for engagement with an operating lever or the like, whereby the screw may be rotated for longitudinally adjusting the bearing block 27. The forward end of the base frame 1 is provided with a bearing 32 which is in axial alignment with a bearing aperture in the aforementioned bearing block 27. A sleeve 34 is journalled in the bearing 32 and bearing block 27 and is provided with a radial flange 35 adjacent the forward end of the bearing block 27. It will be noted that the radial flange 35 is spaced a short distance from the radial flange 15 for a purpose that will later appear. A roll 36 is splined within the sleeve 34 and projects a short distance beyond the radial flange 35 and into contact with the radial flange 15 on the sleeve 13. The outer end of the roll 36 is materially reduced as indicated at 36a. A combined radial and thrust bearing 37 is confined upon the reduced portion of the roll shaft 36 and a suitable bearing cap 38 surrounds the combined radial and thrust bearing and is attached to the end of the bearing 32 whereby the roll 36 is rotatably anchored against longitudinal movement. The bearing sleeve 34 is however longitudinally adjustable through the instrumentality of the screw rod 30 and for this purpose a pair of nuts 39 are threaded upon the sleeve adjacent the rear end of the bearing block 27, whereby the bearing sleeve 34 is constrained to move with the block 27. It will be noted that there is a suitable space 40 between the outer end of the sleeve 34 and the end of the cap 38 to allow for the longitudinal adjustment of the sleeve 34. It will be noted that the roll 36 is provided with a long keyway 41 for receiving the key 42 in the sleeve 34 to allow for relative adjustment. A spur gear 43 is secured upon the sleeve 34 adjacent the bearing 32 and this spur gear meshes with a pinion 44 which is secured upon a shaft 45 which is suitably journalled in the frame 1 and which is coupled to the motor shaft 46 of the aforementioned motor 2. It will be noted that the pinion 44 is considerably longer than the width of the gear wheel 43 so that the longitudinal adjustment of the gear 43 in connection with its supporting sleeves will always be in mesh with said pinion.

With reference to Figure 1, it will be noted that the axes of the rolls 16 and 36 are normally in spaced relation and that the end of each roll contacts the opposite radial flange whereby a closed pass is formed through which a ring 47 may pass during the rotation of said roll. As the ring is rotated through said pass, it will be obvious that the outer portions of the flanges 15 and 35 will travel faster than the inner portions thereof, since they have further to travel during one rotation of the sleeve. Consequently, there is bound to be a certain amount of drag between the ring 47 and the said flanges. This draw is likely to produce what is known as cross-cutting or serrating the ring. To eliminate this cross-cutting as much as possible, the flanges 15 and 35 or at least one of them may be rotatably mounted upon its sleeve as shown in Figures 5 and 6.

In referring to Figure 5, it will be noted that the sleeve 34a which is mounted in the bearing block 27a is provided with a terminal flange 35a rotatably mounted upon the sleeve 34a and that the ring 47 bears against the rotatable flange 35a. In order to prevent longitudinal movement of the rotatable flange 35a, the end of the sleeve 34a is provided with a groove 48 in which a rib 49 on the inner periphery of the flange 35a extends. A thrust bearing 50 of any approved design is preferably mounted between the rotatable or floating ring 35a and the bearing block 27a and if desirable a circular bearing 51 having terminal ribs 52 which respectively fit in grooves in the floating ring 35a and the bearing block 27a may be used. Of course, the ribs 52 that engage the floating flange 35a should have a sufficiently loose fit to allow free rotation of said flange.

In varying the size of the ring-pass, the roll 16 may be longitudinally shifted by operating the hand wheel 22. The roll 36 is however not longitudinally adjustable. The sleeve 34 that carries the roll 36 is however relatively adjustable to its roll by means of the slidable bearing 27 whereby it becomes possible to vary the width of the ring-pass. In order to vary the radial thickness of a ring, the motor 10 may be operated for raising or lowering the structure that supports the inner roll 16 as is obvious.

The operation of this type of machine is well understood and requires no elaborate description. Each roll has an independent motor for operating the same, whereby different velocities of the rolls is possible to compensate for the differences between the inner and outer circumferences of the ring.

From the foregoing it will be appreciated that a very simple structure has been provided in which the roll-pass may be readily varied to any width within its range without changing the rolls and in which the adjustments may be readily and speedily effected without loss of time or without much difficulty.

I am aware that many changes may be made and numerous details of construction may be varied through a wide range without departing from the principles of this invention and I, therefore, do not purpose limiting the patent granted hereon, otherwise than necessitated by the prior art.

I claim as my invention:

1. In a ring rolling machine, the combination with an endwise adjustable roll, a non-adjustable sleeve for supporting the adjustable roll, a non-adjustable roll, and a longitudinally adjustable sleeve for supporting the non-adjustable roll.

2. In a ring rolling machine, the combination with a roll, means for rotatably anchoring said roll against longitudinal movement, a sleeve slidably keyed to said roll, a bearing for said sleeve and means for longitudinally adjusting said bearing.

3. In a ring rolling machine, a rotatable bearing sleeve, a roll slidably splined in said bearing sleeve, a hand wheel rotatably anchored on the end of the roll shaft and an adjustable connection between said hand wheel and sleeve whereby the rotation of said hand wheel will adjust said roll relatively to said sleeve.

4. In a ring rolling machine, the combination with an endwise adjustable roll, a non-adjustable flange adjacent the forward end of said roll, a non-adjustable roll, and an adjustable flange adjacent the forward end of said non-adjustable roll, said rolls and flanges forming an adjustable ring pass.

5. In a ring rolling machine, the combination with a roll, of a bearing sleeve in which said roll is supported, and a pair of members having a threaded connection, one carried by said sleeve and the other rotatably anchored to said roll.

6. In a ring rolling mill, a sleeve, a roll mounted in said sleeve and projecting beyond the end thereof, and a freely floating flange mounted upon the end of said sleeve.

7. In a ring rolling mill, a sleeve, a roll longitudinally adjustable in said sleeve, a hub secured upon said sleeve and having a threaded portion, and a rotatable member upon said roll having a threaded portion engaging the threaded portion of said hub.

8. In a ring rolling mill, a sleeve, a roll endwise adjustable in said sleeve, a second roll cooperating with said first roll for forming a ring pass, a flanged sleeve surrounding said second roll and means for adjusting said flanged sleeve.

9. In a ring rolling mill, a pair of cooperating rolls, a pair of cooperating flanges, said rolls and flanges forming a ring pass and means for adjusting one roll and one flange, and means for preventing longitudinal movement of the other roll and flange.

In testimony whereof I have hereunto subscribed my name.

JAMES HALL TAYLOR.